April 11, 1950     J. R. HOLLINS     2,503,553
BRAKE INDICATOR SIGNALING MEDIUM
Filed Oct. 1, 1948
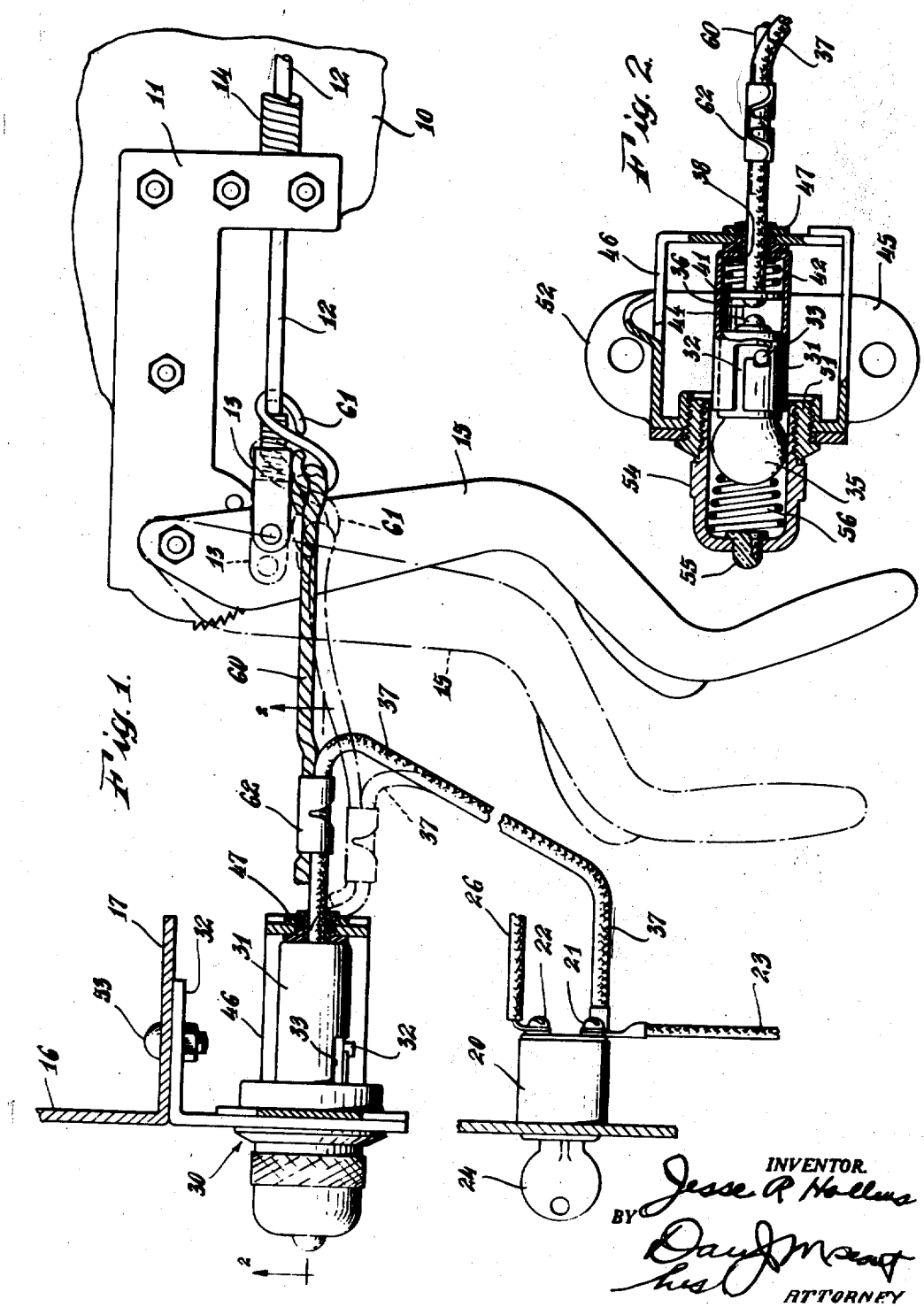

Patented Apr. 11, 1950

2,503,553

UNITED STATES PATENT OFFICE 2,503,553

BRAKE INDICATOR SIGNALING MEDIUM

Jesse R. Hollins, Brooklyn, N. Y.

Application October 1, 1948, Serial No. 52,297

1 Claim. (Cl. 177—311)

This invention relates to indicator lamps, and more particularly to an indicator lamp for signaling the position of an automotive vehicle hand brake lever.

Various hand brake indicator lamp arrangements have been proposed, but have generally been fairly complicated in construction and have required considerable modification of the vehicle dashboard for installation. Additionally, such arrangements have involved the use of special brake lever operated switches to operate the indicator lamp. As a result, such prior art arrangements have not met with any degree of commercial success.

In contrast, the hand or parking brake indicator comprises simply a standard automotive vehicle socket and lamp, with a simple mounting bracket or dash-mounting lamp, and a tension means, such as a cord, connecting the usual lamp "live" conductor to the hand brake lever. The length of the cord is such that, when the dash-mounted brake lever is in the forward, or fully released position, the usual base contact spring of the lamp socket is compressed, by the pull of the cord on the conductor, to separate this contact from the center or base contact of the lamp in the socket. This breaks the lamp energizing circuit, so that the lamp is extinguished when the brake is fully released, and is lit in all other positions of the brake lever.

A feature of the invention is a cap or casing fitting over the lamp. This casing may be made of translucent material or may have an illuminable indicator button or the like. The casing encloses a spring which engages the lamp to prevent the latter rattling in the socket, as may occur when the socket spring is compressed, as described.

The arrangement is simply and easily installed on the dash in front of the hand brake lever. The bracket is either clamped or screwed to the dash to ground the socket, or the latter may be mounted in a hole drilled in the dash. The "live conductor" is attached to the open terminal of the ignition switch. A cord is then clamped or tied to the conductor outside the socket. The end of the cord carries a hook or the like which is slipped over the brake cable at its connection to the lever. The slack in the cord is selected so that the socket base spring engages the conductor contact with the lamp contact at all times except when the brake lever is fully released.

It is accordingly among the objects of this invention to provide a simple, inexpensive, and easily installed hand brake lever indicator.

A further object is to provide such an indicator in which no switch is needed.

A still further object is to provide such an indicator including anti-rattling means for the indicator lamp.

These, and other objects, advantages and novel features of the invention will be apparent from the following description and the accompanying drawing. In the drawing:

Fig. 1 is an elevation view, partly in section, illustrating the invention incorporated in a motor vehicle having a hand or parking brake lever pivotally mounted behind its dashboard.

Fig. 2 is a longitudinal sectional view through the indicator lamp.

Referring to Fig. 1, a motor vehicle frame is indicated at 10 as having a bracket 11 on which is pivoted a hand or parking brake operating lever 15. Lever 15 operates the brakes through the medium of a cable 12 attached to a clamp 13 on the lever and extending through a flexible casing or housing 14.

Lever 15 is mounted behind the vehicle dashboard 16 having a flange 17 and an extension 18 on which is mounted an ignition switch 20 having an "open" terminal 21 and a "live" terminal 22. Terminal 21 is connected to the vehicle source of electric potential, such as the battery and/or generator (not shown) by conductor 26. A key 24 operates the ignition switch, and a conductor 23 connects terminal 21 to the ignition coil system (not shown) of the vehicle.

The indicator of the invention is illustrated generally at 30, and comprises a standard lamp socket 31 having a bayonet slot 32 receiving a pin 33 on the base 34 of lamp 35. Socket 31 has a base contact 36 on the end of a conductor 37 extending through an aperture 38 in the base of the socket. Contact 36 carries an insulating member, such as a washer 41, and a spring 42, surrounding conductor or insulated wire 37, extends between washer 41 and the closed base 43 of the socket. Lamp 35, when engaged in the socket 31, is held firmly therein by spring 42 forcing contact 36 against the center or base contact 44 of the lamp. The arrangement so far described is that of a standard vehicle lamp and socket.

In the specific embodiment shown, a bracket 45 is provided for mounting socket 31 on the flange 17 of dashboard 16 of the vehicle. A rectangular protecting bracket 46 surrounds socket 31, and has an eyelet 47 in its rear wall for conductor 37. The forward wall of bracket 46 is formed with a threaded collar. Collar 48 receives a nut 51 which clamps bracket 45 to bracket 46.

Bracket 45 has a flange 52 which is secured to flange 17 by studs, or the like 53. Threaded into collar 48 is a casing or cap 54 having an illuminable button or the like 55 in its forward wall. For a purpose to be described, casing 54 encloses a spring 56 engaging lamp 35.

Indicator 30 is secured in operative relation to the vehicle elements in the following manner. Holes are drilled in flange 17 to receive studs 53, thus mounting indicator 30 on the dash immediately in front of lever 15. The end of conductor 37 is connected to "open" terminal 21 of ignition switch 20. A cord, spring or the like 60 is provided to connect the indicator to lever 15.

One end of cord 60 carries a hook 61 which is slipped over cable 12 at its connection to clamp 13. The lever 15 is moved forwardly to its fully released position, cord 61 is pulled taut and conductor 37 is pulled out of contacting position in socket 31 sufficiently to compress spring 42 and disengage contacts 36 and 44. With cord 60 still taut, its other end is secured to conductor 37, just beyond the bracket 46, by a suitable clamp or the like 62. Since conductor 37 is always connected to the "open" terminal of the ignition switch, the unit is in operation only when the ignition is in "on" position. The assembly is now completed.

When lever 15 is pulled rearwardly to apply the brakes, cord 60 is slacked, allowing spring 42 to engage contacts 36, 44 to light lamp 35. The lamp is lighted in any but the fully released position of lever 15. In the latter position, cord 60 is taut, compressing spring 42 to disengage contacts 36, 44, breaking the lamp circuit and extinguishing lamp 35.

A positive indication of the position of lever 15 is thus given at all times, without the necessity of using a special switch. Only a standard vehicle lamp and socket are required, and the socket may be mounted through dashboard 16 if desired. Spring 56 in cap 54 presses lamp 35 into socket 31 when spring 42 is compressed, preventing lamp 35 from rattling in its socket.

While a specific embodiment of the invention has been shown and described in detail to illustrate the application of the principles thereof, it will be understood that the invention may be otherwise embodied, without departing from such principles.

What is claimed is:

A hand brake signal for automotive vehicles having a hand brake operating lever pivotally mounted on the vehicle frame and a cable connecting said lever to the brakes, said signal comprising, in combination, an automotive type lamp socket having a contact in its base biased by a spring toward the base contact of a lamp mounted in said socket, and a conductor connected to said contact and extending outwardly through the socket base for connection to a source of electric potential; a bracket secured to the vehicle frame and mounting said socket; a cord secured to said conductor outside said socket; means on the other end of said cord detachably connectible to said cable at the latter's connection to said lever, the length of said cord being such that, in the fully released position of said lever, said cord will exert a pull on said conductor to draw said conductor contact away from said lamp base contact whereby said lamp will be extinguished in the fully released position of said lever, said spring engaging said contacts to light said lamp in any but the fully released position of said lever; a casing secured to said bracket and surrounding said lamp, said casing having an illuminable indicator in its face; and a spring in said casing engaging said lamp and biasing the same into firm seating engagement in said socket.

JESSE R. HOLLINS.

REFERENCES CITED

The following references are of record in the file of this patent:

UNITED STATES PATENTS

| Number | Name | Date |
|---|---|---|
| 2,343,394 | Blomberg et al. | Mar. 17, 1944 |